United States Patent
Suhama et al.

(10) Patent No.: US 8,269,446 B2
(45) Date of Patent: Sep. 18, 2012

(54) ELECTRIC VEHICLE CONTROL DEVICE

(75) Inventors: Masayoshi Suhama, Toyota (JP); Hideto Hanada, Toyota (JP); Masaki Okamura, Toyota (JP); Hiroaki Kioka, Nishio (JP); Ken Iwatsuki, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/067,869

(22) Filed: Jun. 30, 2011

(65) Prior Publication Data

US 2011/0282530 A1 Nov. 17, 2011

Related U.S. Application Data

(63) Continuation of application No. 12/312,553, filed as application No. PCT/JP2008/052071 on Jan. 31, 2008, now Pat. No. 7,973,505.

(30) Foreign Application Priority Data

Feb. 13, 2007 (JP) ................................. 2007-031433

(51) Int. Cl.
*H02P 7/00* (2006.01)
(52) U.S. Cl. ........ 318/432; 318/434; 318/376; 318/800; 318/806; 903/903; 903/907; 903/908; 180/65.31; 180/65.265; 180/65.1
(58) Field of Classification Search .................. 318/432, 318/434, 376, 800, 806; 903/903, 907, 908; 180/65.31, 65.265, 65.1; 290/40 C
See application file for complete search history.

(56) References Cited

U.S. PATENT DOCUMENTS

| 4,335,429 | A  | * | 6/1982 | Kawakatsu | ................ | 701/102 |
| 6,340,847 | B1 | * | 1/2002 | Kawabata et al. | ......... | 290/40 C |
| 6,549,832 | B2 | * | 4/2003 | Nakasako et al. | ............. | 701/22 |
| 6,617,704 | B2 |   | 9/2003 | Tomikawa | | |
| 6,672,415 | B1 |   | 1/2004 | Tabata | | |
| 7,028,795 | B2 |   | 4/2006 | Tabata | | |
| 7,054,726 | B2 |   | 5/2006 | Kowatari et al. | | |
| 7,632,212 | B2 | * | 12/2009 | Yamanaka et al. | ............ | 477/107 |
| 7,822,524 | B2 | * | 10/2010 | Tabata et al. | ................. | 701/53 |

(Continued)

FOREIGN PATENT DOCUMENTS

EP    1 454 787 A2    9/2004

(Continued)

OTHER PUBLICATIONS

May 1, 2008 International Search Report issued in PCT/JP2008/052071.

(Continued)

*Primary Examiner* — Rita Leykin
(74) *Attorney, Agent, or Firm* — Oliff & Berridge, PLC

(57) ABSTRACT

When an electric vehicle outputs a torque instruction, firstly, a request torque is acquired and a judged whether the acquired request torque is positive or negative. Regardless of the sign of the request torque, it is judged whether the eco-switch is ON. If the request torque has a positive sign and the eco-switch is OFF, a map A is selected. If the eco-switch is ON, a map B which limits the maximum torque to a low value for the map A is selected. If the request torque has a negative sign, a map C is selected regardless of the eco-switch ON/OFF state and the maximum torque is not limited.

4 Claims, 3 Drawing Sheets

U.S. PATENT DOCUMENTS

2002/0107618 A1   8/2002   Deguchi et al.

FOREIGN PATENT DOCUMENTS

| | | |
|---|---|---|
| JP | A-06-121405 | 4/1994 |
| JP | A-10-248106 | 9/1998 |
| JP | A-11-205914 | 7/1999 |
| JP | A-2004-274879 | 9/2004 |
| JP | A-2006-151039 | 6/2006 |
| JP | A-2008-193762 | 8/2008 |
| JP | A-2008-301598 | 12/2008 |
| WO | WO 2008/093687 A1 | 8/2008 |
| WO | WO 2008/146762 A1 | 12/2008 |

OTHER PUBLICATIONS

Mar. 4, 2011 Notice of Allowance issued in U.S. Appl. No. 12/312,553.

* cited by examiner

ELECTRIC VEHICLE CONTROL DEVICE

This is a Continuation of application Ser. No. 12/312,553 filed May 15, 2009, which in turn is a National Phase of Application No. PCT/JP2008/052071 filed Jan. 31, 2008. The disclosure of the prior applications is hereby incorporated by reference herein in its entirety.

BACKGROUND

1. Technical Field

The present invention relates to an electric vehicle control apparatus, and more particularly to an electric vehicle control apparatus having a low-fuel-consumption instruction acquisition means for acquiring a low-fuel-consumption drive instruction from a user.

2. Related Art

In recent years, so-called electric vehicles such as environmentally friendly electric cars, hybrid cars, and fuel-cell cars have been attracting attention. From the viewpoint of friendliness to the environment, promoting energy savings is desirable. To improve fuel consumption of a vehicle, vehicle maneuverability, comfort of a cabin space, and the like are sacrificed to some extent by limiting the power performance, air conditioning capacity, and the like of the vehicle. Therefore, it is desirable that the driver be able to select an energy saving mode by performing a simple operation. The control section of the vehicle is provided with a switch or the like for giving a low-fuel-consumption drive instruction. Such a switch is called, for example, an "eco-mode switch" or simply an "eco-switch."

For example, JP-A No. Hei 10-248106 discloses an electric car control apparatus for switching the running motor between a normal mode and an eco-mode in response to operation of a mode selection switch. The normal mode has a high output of 100% and the eco-mode has a low output of 60%, and in the eco-mode the output is gradually increased to 90% at the time of climbing a hill where power shortage occurs.

Thus, the switch for a low-fuel-consumption drive instruction is provided, so that the driver can select running with low fuel consumption. According to the example of JP-A No. Hei 10-248106, when the eco-mode is selected, the low output of 60% is set. Thus, the output is limited with priority given to the reduction of fuel consumption. In this case, if the output on a regenerative side is also limited, electric energy to be recovered is reduced and a braking force serving as a regenerative brake is lowered. If the insufficient braking force is supplemented by, for example, a hydraulic brake, the fuel consumption may fail to be reduced.

The present invention provides an electric vehicle control apparatus which enables effective recovery of regenerative power when a low-fuel-consumption drive instruction is given.

SUMMARY OF THE INVENTION

An electric vehicle control apparatus according to the present invention comprises a drive section including a rotary electric machine and a power source device connected to the rotary electric machine; and a control section for controlling the drive section, wherein the control section is provided with a low-fuel-consumption instruction acquisition unit for acquiring a low-fuel-consumption drive instruction from a user; a drive/regeneration judging unit for judging whether the rotary electric machine is in a power drive mode or a regenerative mode; and an output unit that, when the low-fuel-consumption drive instruction is acquired and the drive/regeneration judging unit judges that the rotary electric machine is in the power drive mode, outputs, in response to a request torque, a torque instruction under a limit torque characteristic having limited the maximum power driving torque at the time of normal running free from the low-fuel-consumption drive instruction, and, when the drive/regeneration judging unit judges that the rotary electric machine is in a regenerative mode, outputs, in response to the request torque, a torque instruction under a torque characteristic of the maximum regenerative torque equal to that of the normal running.

Preferably, in the electric vehicle control apparatus according to the present invention, the output unit changes a voltage increase ratio of the power source device and outputs a torque instruction under the limit torque characteristic.

According to the electric vehicle control apparatus of the present invention, if the vehicle is in a power drive mode when a low-fuel-consumption drive instruction is acquired, the maximum power driving torque is limited and a torque instruction is output, but if the vehicle is in a regenerative mode, the torque instruction is output without limiting the maximum regenerative torque. Therefore, when the low-fuel-consumption drive instruction is given, regenerative power can be recovered effectively.

DETAILED DESCRIPTION

An embodiment of the present invention are described below in detail with reference to the drawings. In the embodiment, an electric vehicle is described as a hybrid vehicle provided with an electrical storage device and an engine, but may also be an electric car not having an engine, or a fuel-cell car having a fuel cell as a power source. Further, the vehicle is described as having a so-called motor/motor generator which serves as both a motor and a generator, but may have a motor and a generator as separate components. Further, the vehicle may be a general vehicle having a rotary electric machine and a power circuit connected thereto. The vehicle is not limited to a single rotary electric machine, but may have, for example, two rotary electric machines.

Figure 1:
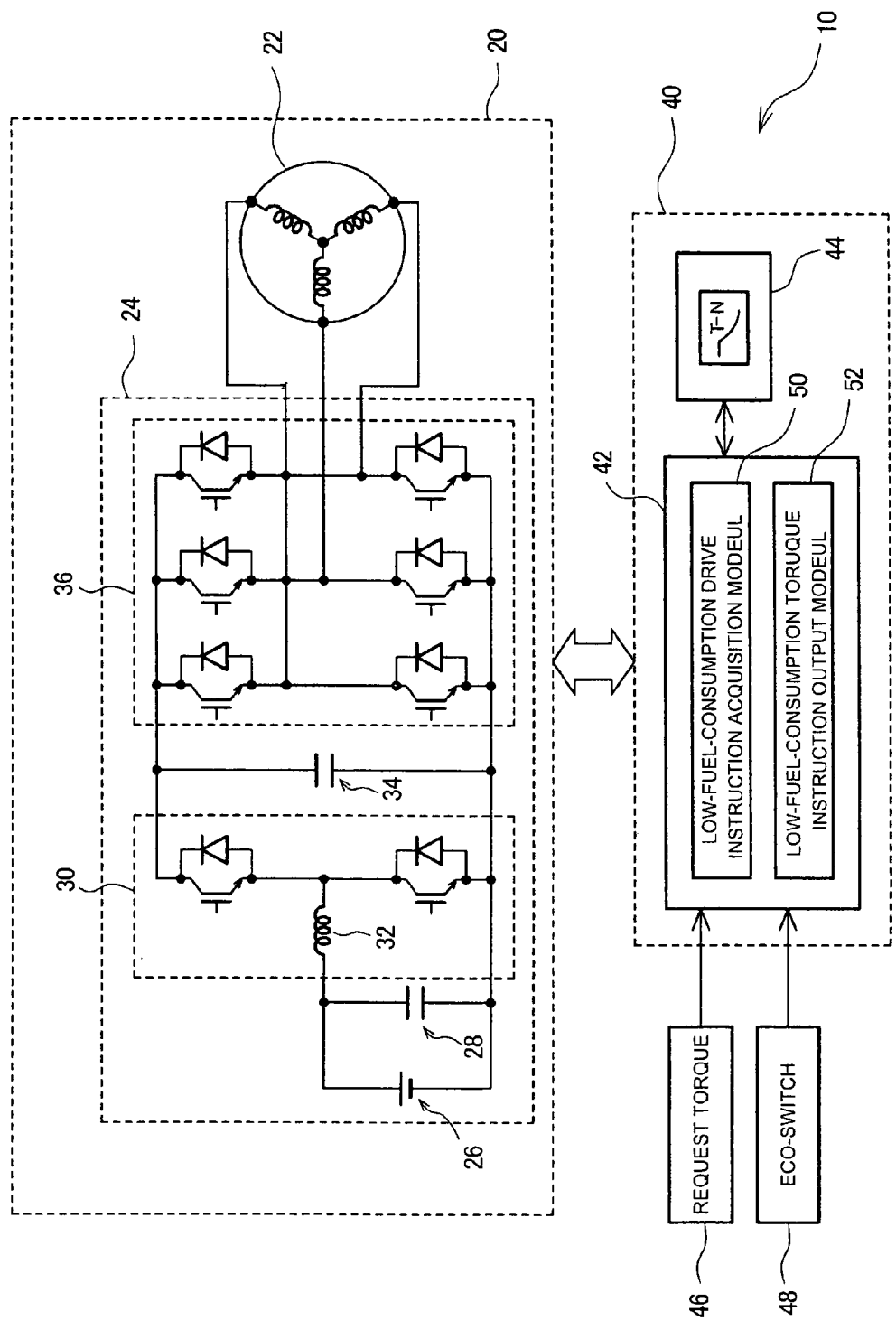
FIG. 1 is a diagram showing the configuration of an electric vehicle control apparatus of an embodiment of the present invention.

FIG. 1 is a diagram showing the configuration of a control apparatus for a motor/generator portion in the hybrid vehicle having the engine and the motor/generator. An electric vehicle control apparatus 10 is configured to have a drive section 20 and a control section 40. The drive section 20 includes a motor/generator 22, and a power source device 24 connected to the motor/generator 22. The control section 40 has a CPU 42, and a memory unit 44 for storing a T-N characteristic map, etc. to be described later.

The drive section 20 is configured to include the motor/generator 22, which functions as a drive motor when the vehicle carries out a power driving operation and functions as a generator when the vehicle brakes as described above, and the power source device 24, which supplies power to the motor/generator 22 when it functions as the drive motor or recharges an electrical storage device upon receiving regenerative power when the motor/generator 22 functions as the generator.

The power source device 24 is configured to include an electrical storage device 26; which is a secondary battery; a smoothing capacitor 28 disposed adjacent to the electrical storage device; a voltage converter 30 having a reactor 32; a smoothing capacitor 34 adjacent to a high-voltage side; and an inverter circuit 36.

The electrical storage device 26 may be, for example, a capacitor, or a lithium ion battery pack or a nickel-hydrogen battery pack having a terminal voltage of about 200V to about 300V.

The voltage converter 30 is a circuit having a function of increasing the voltage on the side of the electrical storage device 26 to, for example, about 600V by means of the energy accumulation action of the reactor 32. The voltage converter 30 has a bidirectional function and also has an action of lowering the high voltage on the side of the inverter circuit 36 to a voltage suitable for the electrical storage device 26 when the power from the inverter circuit 36 is supplied as charging power to the electrical storage device 26.

The inverter circuit 36 is a circuit having a function of converting the high voltage DC power into three-phase AC drive power and supplying it to the motor/generator 22, and, conversely, a function of converting the three-phase AC regenerative power from the motor/generator 22 into the high voltage DC charging power.

The control section 40 has a function of controlling the actions of individual elements of the drive section 20 upon receiving an instruction from an unillustrated vehicle control section, and particularly a function of outputting to the drive section 20 a torque instruction for effectively recovering the regenerative power when an eco-switch 48 is turned ON.

The eco-switch 48 is a control arbitrarily operated by a user, and takes the form of a switch having a function of outputting a low-fuel-consumption drive instruction signal indicating that the user desires low-fuel-consumption running when the switch is turned ON. The eco-switch 48 can be provided, for example, at an appropriate position accessible from the driver's seat.

A request torque 46 is an instruction signal output from an unillustrated vehicle control section, and is an information signal indicating the contents of the torque requested by the motor/generator 22 according to states of, for example, a gas pedal, a brake pedal, a speed change gear, and the like. The contents of the request torque 46 include a sign for discrimination between a power drive torque; namely, a vehicle drive torque, and a regenerative torque; namely a vehicle brake torque, as well as a torque amount indicating a torque magnitude.

The control section 40 includes the CPU 42 and the memory unit 44 and has a function of controlling the operations of individual elements of the drive section 20 while monitoring the states of the individual elements as described above. The states of the individual elements of the drive section 20 which are monitored include, for example, the number of revolutions N of the motor/generator 22, the terminal voltage and output current of the electrical storage device 26, the output torque of the motor/generator 22, and the like. These condition signals are input to the control section 40. The control section 40 can be composed of a computer which is suitably mounted on the vehicle. The control section 40 can be configured as an independent computer, and the function of the control section 40 can also be included in the function of another computer mounted on the vehicle. For example, if an entire control section for controlling the whole vehicle or a hybrid CPU or the like is mounted, the function of the control section 40 can be included in their functions.

The CPU 42 has functions of generally controlling the drive section 20; namely, operating the voltage converter 30 in accordance with the request torque 46, and controlling the inverter circuit 36 to generate an appropriate three-phase AC drive signal to be supplied to the motor/generator 22. The CPU 42 is especially configured to include a low-fuel-consumption drive instruction acquisition module 50 which acquires an ON/OFF state of the eco-switch 48, and a low-fuel-consumption torque instruction output module 52 which outputs a torque instruction to effectively recover the regenerative power if it determines that the eco-switch 48 is ON. Such functions are realized by execution of software, and more specifically by execution of a corresponding electric vehicle control program. The functions can also be partially realized by hardware.

In addition to storing of the control program and the like necessary for the operation of the control section 40, the memory unit 44 specially has a function of storing the T-N characteristic map, etc. related to the torque T and the number of revolutions N of the motor/generator 22. The T-N characteristic map, etc. indicate a map showing a relationship between the torque T and the number of revolutions N of the rotary electric machine. Here, the map, etc. broadly indicate a means having a function of inputting the torque T and outputting the number of revolutions N or, conversely, inputting the number of revolutions N and outputting the torque T, and encompass a calculation formula and the like in addition to a so-called conversion map and a lookup table.

The action of the above-configured electric vehicle control apparatus 10, and particularly the function of the low-fuel-consumption torque instruction output module 52 of the CPU 42 of the control section 40, is described in detail below with reference to the flow chart of FIG. 2, etc. The reference numerals of FIG. 1 are used for the following description.

Figure 2:
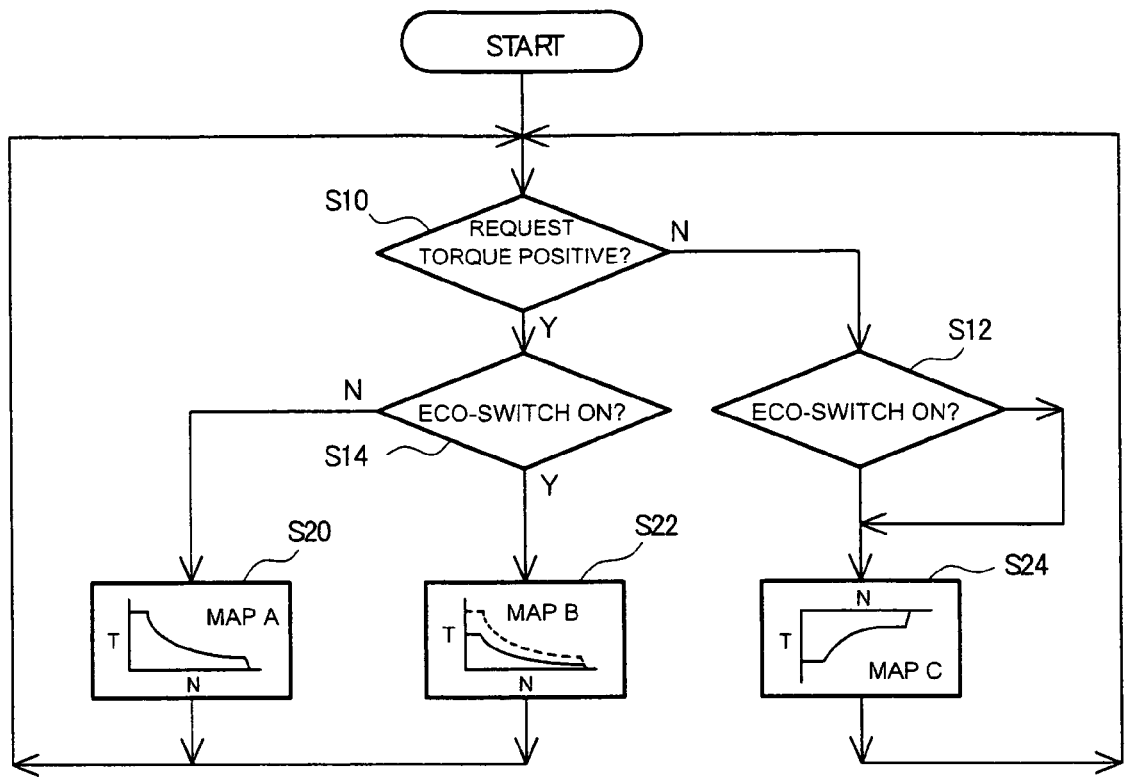
FIG. 2 is a flowchart showing a procedure to output a torque instruction when running with low fuel consumption in the embodiment.

FIG. 2 is a flow chart showing a procedure to output a torque instruction when running with low fuel consumption, and the procedure corresponds to individual processing procedures of the corresponding electric vehicle control program. When the electric vehicle outputs a torque instruction, the request torque 46 is first acquired, and a judgement is made as to whether or not the acquired request torque is positive (S10). This is a judgment of the sign of the request torque 46; the request torque 46 can be determined to have a positive sign when the vehicle is power driven, and to have a negative sign when the vehicle is braked. Thus, when the sign of the request torque 46 is determined, the judgment of whether or not the request torque 46 is positive is also a judgment of whether the vehicle is to be power driven or braked. Therefore, this step is also a judgment step of whether the content of the request torque 46 supplied from the control section of the unshown vehicle as a whole is to effect power driving or braking.

Regardless of whether the request torque 46 has a positive or negative sign, a judgement is then made as to whether or not the eco-switch 48 is ON (S12, S14). However, the T-N characteristic map to be used to output the torque instruction differs depending on whether the request torque 46 has a positive or negative sign. FIG. 2 shows that three T-N characteristic maps, a map A, a map B, and a map C, are used according to the state of the vehicle to be controlled. The contents of the map A, map B, and map C are described in detail afterward. S10, S12, and S14 indicate a procedure of selecting a map to be used depending on a positive or negative sign of the request torque 46 and ON or OFF of the eco-switch 48. So long as the map can be selected, the order of the procedure or the processing content does not matter.

By the procedure of S10, 512, and S14, the T-N characteristic map to be used to output a torque instruction is specified by selecting as follows according to the state of the vehicle to be controlled.

If the request torque 46 has a positive sign and the eco-switch 48 is OFF, the map A is selected (S20). This is a state where the vehicle is power driven but the user does not desire low-fuel-consumption running, indicating a power driving state where it is not necessary to consider braking in a so-called normal running condition. Therefore, a T-N characteristic map of normal running in power driving condition is selected for the map A, and the map A is used to output a torque instruction.

If the request torque 46 has a positive sign and the eco-switch 48 is ON, the map B is selected (S22). This is a state where the vehicle is power driven and the user desires low-fuel-consumption running. In this situation, it is not necessary to consider braking. Therefore, a map in which the upper limit of the torque is more limited than the T-N characteristic of the normal running in the power driving condition is selected for the map B, and the map B having the torque limited is used to output the torque instruction.

If the request torque 46 has a negative sign, the map C is selected regardless of whether the eco-switch 48 is ON or OFF (S24). This is a state where the vehicle is braked. Since there is no relation with whether the eco-switch 48 is ON or OFF, the T-N characteristic map at the time of normal braking can be used. The T-N characteristic map at the time of normal braking is a map with inversion of the torque sign of the map A which is the T-N characteristic map at the time of the normal power driving. Namely, it corresponds to the inversion of the map A about a line of torque=0. Therefore, the map C used is the inversion of the torque sign of the T-N characteristic of normal running in the power driving condition and does not limit the torque upper limit even if the eco-switch 48 is turned ON.

Figure 3:
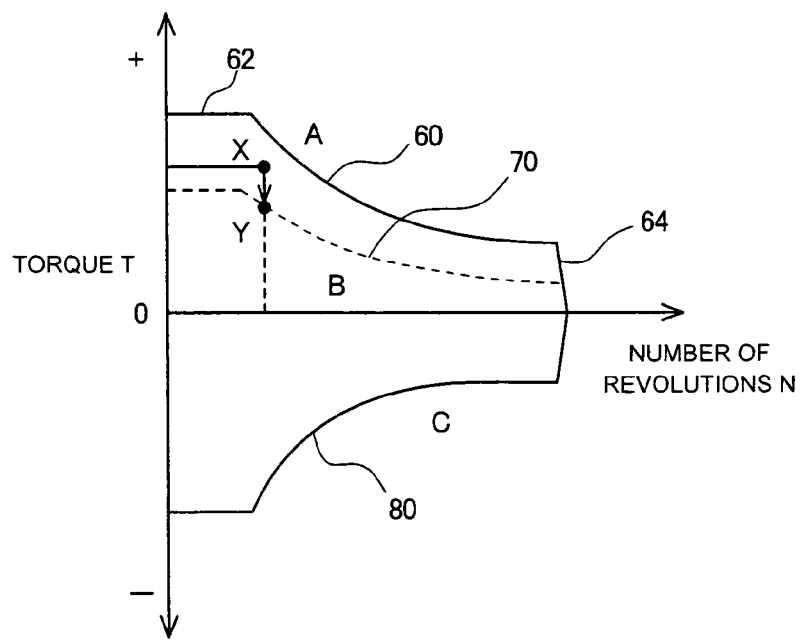
FIG. 3 is a diagram illustrating a map A, a map B, and a map C in the embodiment.

FIG. 3 is a diagram illustrating the contents of the map A, the map B, and the map C. The horizontal axis of FIG. 3 represents the number of revolutions N of the motor/generator 22, the vertical axis represents the output torque T of the motor/generator 22, and positive and negative signs are shown. FIG. 3 shows three T-N characteristics. A first T-N characteristic 60 has the vertical axis shown at a positive portion and corresponds to the map A. A second T-N characteristic 70 has the vertical axis shown at the positive portion, but the maximum torque is limited and the torque is made small in comparison with the T-N characteristic 60 of the map A. In other words, it is a T-N characteristic with the torque limit applied to the T-N characteristic 60 of the map A and corresponds to the T-N characteristic of the map B. A third T-N characteristic 80 has the vertical axis shown at the negative portion and is shown as a characteristic with the T-N characteristic 60 of the map A inverted about the horizontal axis, and corresponds to the T-N characteristic of the map C.

The T-N characteristic 60 of the map A is a T-N characteristic of the normal running in the power driving condition and forms the basis of the T-N characteristic 70 of the map B and the T-N characteristic 80 of the map C. Generally, the T-N characteristic 60 of the map A is a diagram showing a relation between the torque T and the number of revolutions N when the power is constant, in view of the relation of power=T×N. In a region having a large torque T, it is determined to be a constant torque 62 by current limit of the inverter circuit 36, and in a region having a large number of revolutions N, it is determined to be a limited number of revolutions 64, in view of the limitation of the maximum speed of the vehicle.

The T-N characteristic 70 of the map B has the torque limited by making the maximum torque lower than the T-N characteristic 60 of the map A to have low fuel consumption when the eco-switch 48 is turned ON in the power driving condition as described above. Therefore, when the eco-switch 48 is turned ON in the power driving condition, the torque value is lowered to the value of the T-N characteristic 70 of the map B if the request torque exceeds the T-N characteristic 70 of the map B, and the low torque value is output as the torque instruction to the drive section 20.

For example, it is assumed in FIG. 3 that the request torque 46 having the value indicated by point X exceeding the T-N characteristic 70 of the map B is acquired. If the eco-switch 48 is OFF, the maximum torque is limited by the T-N characteristic 60 of the map A, so that the torque value of the point X is not limited, and the value of the request torque 46 is output as is as the value of the torque instruction. Meanwhile, if the eco-switch 48 is turned ON, the maximum torque is limited by the T-N characteristic 70 of the map B, so that the torque value of the point X is limited to a low level of the torque value of point Y on the T-N characteristic 70 of the map B. Therefore, even if the value of the request torque 46 is the point X, the torque value of the point Y is used for the value of the torque instruction. When the eco-switch 48 is turned ON as described above, the maximum torque is limited to the torque value on the T-N characteristic 70 of the map B with the maximum torque more limited than the T-N characteristic 60 of the map A used for normal power driving. Thus, low fuel consumption is realized.

The T-N characteristic 80 of the map C is the inversion of the T-N characteristic 60 of the map A about the horizontal axis as described above. Regardless of whether the eco-switch 48 is OFF or ON, the T-N characteristic 80 of the same map C is used. Specifically, if the eco-switch 48 is ON at the time of power driving, the maximum torque is limited to a low value in comparison with the normal running condition, but at the time of the regenerative operation, the same maximum torque is determined as in the normal braking condition. Thus, when the eco-switch is ON, low fuel consumption is realized during the power driving, and regenerative power can be effectively recovered to the maximum extent during the regenerative operation.

Figure 4:
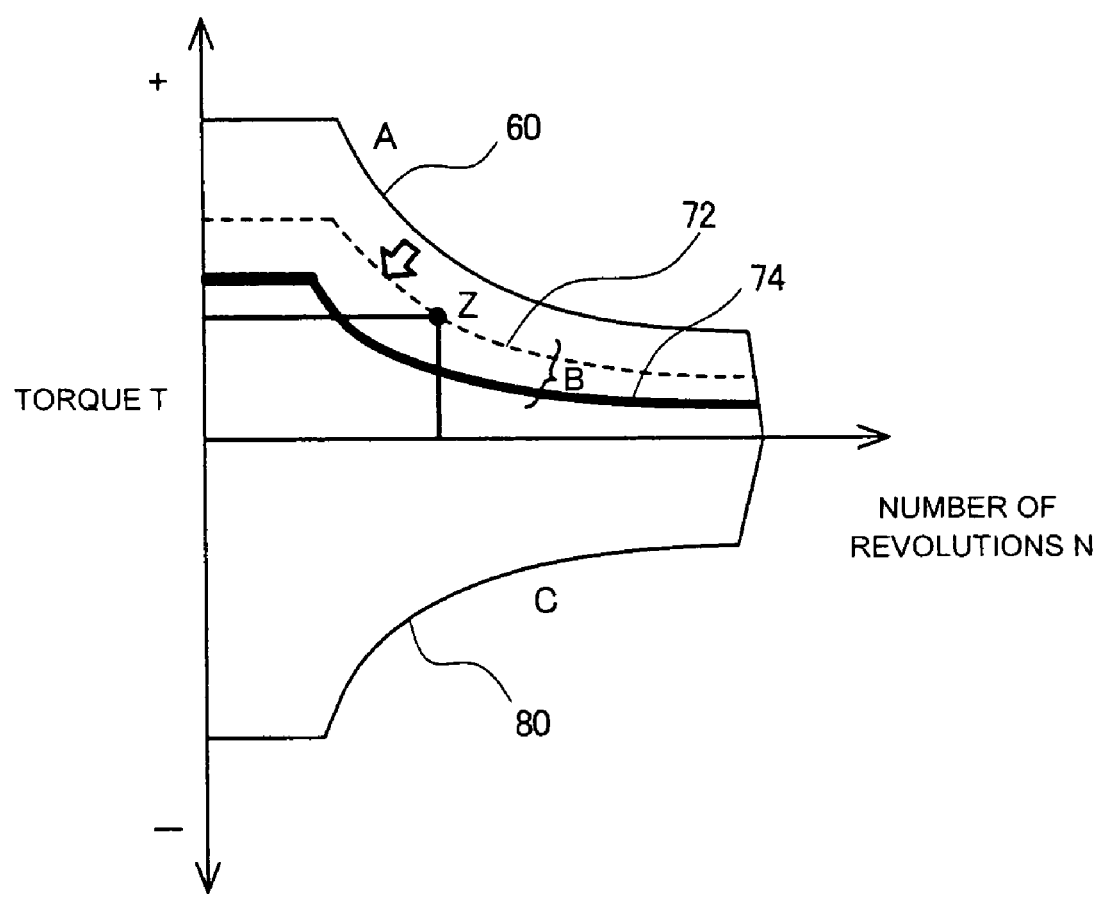
FIG. 4 is a diagram illustrating a state of limiting a maximum torque by changing a voltage increase ratio in the embodiment.

FIG. 4 is a diagram showing an example of realizing the T-N characteristic of the map B by changing a voltage increase ratio of the voltage converter 30. There are shown the T-N characteristic 60 in a normal running condition when the voltage increase ratio of the voltage converter 30 is normal, a low voltage T-N characteristic 72 when the voltage increase ratio of the voltage converter 30 is lowered arbitrarily, and a no-voltage increase T-N characteristic 74 when the voltage converter 30 has a voltage increase ratio=1; namely, the voltage of the electrical storage device 26 is supplied as is without increasing the voltage to the motor/generator 22 through the inverter circuit 36. In this case, the T-N characteristic 80 of the map C also has no change, similar to that which was described with reference to FIG. 3. Thus, the regenerative power can be effectively recovered to the maximum extent during the regenerative operation.

It is assumed that the request torque is indicated by point Z. If the eco-switch 48 is OFF, the maximum torque is limited by the T-N characteristic 60 of the map A, so that the torque value of the point Z cannot be limited, and the value of the request torque 46 is output as the value of the torque instruction. Meanwhile, if the eco-switch 48 is turned ON, the voltage increase ratio of the voltage converter 30 is changed to have the T-N characteristic 72 which passes through the point Z. In addition, the drive section 20 operates at the above voltage increase ratio. Therefore, when the voltage increase ratio is changed, the maximum torque falls in a more limited state than in the T-N characteristic 60 of the map A during normal running, thereby realizing low fuel consumption. The T-N characteristic 72 which passes through the point Z can be obtained by retrieval from the T-N characteristics to be stored in the memory unit 44 with the torque value and the number of revolutions at the point Z used as retrieval keys.

If the torque value is larger than the no-voltage increase T-N characteristic 74 at the point Z, the voltage increase ratio of the voltage converter 30 is changed as described above, and a torque instruction under the limit torque can be output. At the point Z based on the request torque, if the torque value is smaller than the no-voltage increase T-N characteristic 74, the torque value on the no-voltage increase T-N characteristic 74 becomes the value of the torque instruction.

What is claimed is:

1. An electric vehicle control apparatus, comprising:
a drive section including a rotary electric machine and a power source device connected to the rotary electric machine; and a control section for controlling the drive section, wherein:
while low-fuel-consumption running is instructed by a user, when power drive is carried out, a reduced maximum power driving torque that is smaller than a maximum power driving torque at a time without a low-fuel-consumption running instruction is set, and when regeneration is carried out, a maximum regenerative torque that is the same as that at a time without a low-fuel-consumption running instruction is set.

2. An electric vehicle control apparatus, comprising:
a drive section including a rotary electric machine and a power source device connected to the rotary electric machine; and
a control section for controlling the drive section, wherein:
when a low-fuel-consumption drive instruction is acquired and the rotary electric machine is in a power drive mode, a torque instruction under a limit torque characteristic having limited a maximum power driving torque at a time of normal running free from the low-fuel-consumption drive instruction is output in response to a request torque, and
when the rotary electric machine is in a regenerative mode, a torque instruction under a same torque characteristic of a maximum regenerative torque as that of the normal running is output according to the request torque.

3. The electric vehicle control apparatus according to claim 2, wherein the control section changes a voltage increase ratio of the power source device and outputs a torque instruction under the limit torque characteristic.

4. A control method for controlling a drive section of an electric vehicle, the drive section including a rotary electric machine and a power source device connected to the rotary electric machine, the control method comprising:
while low-fuel-consumption running is instructed by a user, when power drive is carried out, setting a reduced maximum power driving torque that is smaller than a maximum power driving torque at a time of a normal running mode free from a low-fuel-consumption running instruction, and when regeneration is carried out, setting a maximum regenerative torque that is the same as that of the normal running mode.

* * * * *